United States Patent
Craven et al.

(10) Patent No.: US 7,401,663 B2
(45) Date of Patent: Jul. 22, 2008

(54) ELECTRIC MOTOR DRIVEN HAND-HELD TOOL

(75) Inventors: Daniel Craven, Rowhedge (GB);
Rainer Herting, Langenhahn (DE);
Michael Stirm, Oberursel (DE);
Michael Kunz, Donrdorf (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/712,327

(22) Filed: Nov. 13, 2003

(65) Prior Publication Data
US 2004/0140781 A1 Jul. 22, 2004

(30) Foreign Application Priority Data
Nov. 13, 2002 (GB) ................... 0226523.9

(51) Int. Cl.
*H01H 1/36* (2006.01)
*E21B 3/00* (2006.01)
*B23B 45/02* (2006.01)

(52) U.S. Cl. .................... 173/217; 173/20; 173/171; 200/252

(58) Field of Classification Search .............. 173/20, 173/214–217, 164, 170, 171; 200/252
See application file for complete search history.

(56) References Cited

U.S. PATENT DOCUMENTS

| | | | | |
|---|---|---|---|---|
| 1,245,860 A | * | 11/1917 | Black et al. | 200/417 |
| 2,979,089 A | * | 4/1961 | Piesker | 81/57.11 |
| 3,703,646 A | | 12/1972 | Jacyno | |
| 3,742,364 A | * | 6/1973 | Matthews | 200/522 |
| 4,097,703 A | * | 6/1978 | Houser | 307/126 |
| 4,204,580 A | | 5/1980 | Nalley | |

(Continued)

FOREIGN PATENT DOCUMENTS

DE 33 11 421 A 10/1984

(Continued)

*Primary Examiner*—Paul R Durand
(74) *Attorney, Agent, or Firm*—Michael P. Leary; Adan Ayala

(57) ABSTRACT

An electric motor driven hand-held tool, such as a drilling, hammering or screw driving tool having a tool housing within which is located an integrated switch unit (6). The switch unit (6) includes an electronic motor control unit (8), a first actuator which is actuated by a manually operable power member (4) and to which the control unit is responsive to power the motor and a second actuator (10) which is actuated by a manually operable forward/reverse member (14) and to which the control unit is responsive to drive the motor in a selected forward or reverse direction. The forward/reverse member (14) is located remotely from the switch unit (6) on a portion of the tool housing which can be seen by a user of the tool during normal operation of the tool. To facilitate this a linkage arrangement (16) is provided for actuating the second actuator (10) in response to a manual actuation of the forward/reverse member (14). The linkage (16) is pivotally mounted on a closed end of a jam pot motor casing (3). The linkage comprises a central annular portion (18) pivotally mounted on a boss (4) formed on the motor housing (3), a first upwardly extending arm (20) on which the forward/reverse lever (14) is formed and a second downwardly extending arm (22) which engages the second actuator (10).

20 Claims, 3 Drawing Sheets

U.S. PATENT DOCUMENTS

| | | | |
|---|---|---|---|
| 4,342,931 A * | 8/1982 | Grossmann et al. | 310/50 |
| 4,448,098 A * | 5/1984 | Totsu | 81/467 |
| 4,523,115 A | 6/1985 | Cuneo | |
| 4,523,116 A | 6/1985 | Dibbern, Jr. et al. | |
| 4,588,910 A * | 5/1986 | Bausch | 310/50 |
| 4,649,245 A * | 3/1987 | Lessig et al. | 200/522 |
| 4,684,774 A * | 8/1987 | Dibbern et al. | 200/275 |
| 4,772,765 A * | 9/1988 | Markle et al. | 200/1 V |
| 4,825,961 A | 5/1989 | Neumaier et al. | |
| 5,089,729 A * | 2/1992 | Moores, Jr. | 310/50 |
| 5,311,949 A * | 5/1994 | Chapin | 173/217 |
| 5,525,889 A * | 6/1996 | Chan et al. | 173/217 |
| 5,738,177 A * | 4/1998 | Schell et al. | 173/178 |
| 6,199,642 B1 * | 3/2001 | Becker et al. | 173/217 |
| 6,315,060 B1 * | 11/2001 | Schuda et al. | 173/132 |
| 6,479,918 B1 | 11/2002 | Burger et al. | |
| 6,555,773 B1 * | 4/2003 | Broghammer et al. | 200/61.85 |
| 6,729,414 B2 * | 5/2004 | Cooper et al. | 173/217 |

FOREIGN PATENT DOCUMENTS

| | | |
|---|---|---|
| DE | 33 24 545 A1 | 1/1985 |
| DE | 44 38 045 A1 | 5/1996 |
| EP | 07 90 697 A1 | 8/1997 |
| GB | 23 64 510 A | 1/2002 |

\* cited by examiner

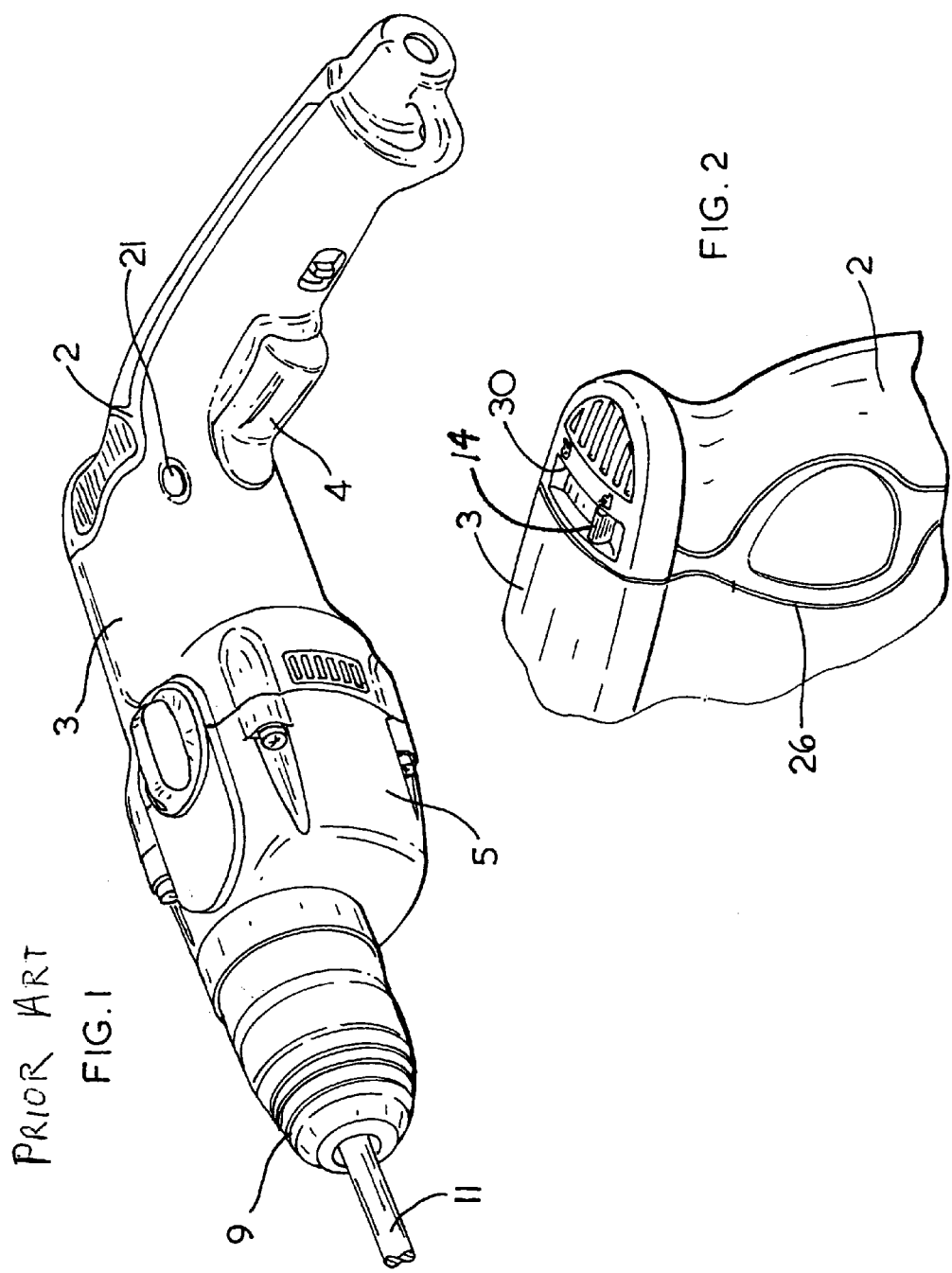

ELECTRIC MOTOR DRIVEN HAND-HELD TOOL

The invention relates to an electric motor driven hand-held tool, such as a hammering, drilling and/or screwdriving tool, having a main switch which is actuated to actuate the motor and a forward/reverse switch which is actuated to select the desired direction of rotation of the motor.

BACKGROUND OF THE INVENTION

The main switch and the forward/reverse switch are conveniently combined in a single integrated switch unit. Such integrated switch units generally includes a first actuator which is actuated via a trigger switch, which trigger switch is depressed by a user to turn the motor on and released to turn the motor off. Generally the speed of the motor can also be controlled depending on the extent that the trigger switch and thus the first actuator is depressed. An electronic control unit, is generally incorporated within the integrated switch unit, and is responsive to the first actuator to apply the appropriate current to the motor. The integrated switch unit will also generally include a second actuator which can be moved between two positions via a forward/reverse lever moveable by a user. The electronic control unit is also generally responsive to the second actuator and in a first forward position of the second actuator the electronic control unit will drive the motor in a forward direction of rotation and in a second reverse position of the second actuator the electronic control unit will drive the motor in a second reverse direction.

In order to prevent damage to the tool, the main switch and the forward/reverse switch are generally mechanically coupled, so that the position of the forward/reverse switch can only be changed to alter the direction of rotation when the main switch is released, ie. when the motor is switched off.

This mechanical and electronic integration of the main switch and the forward/reverse switch suffers from the disadvantage, that the forward/reverse lever, which is actuated by a user is generally located in the region of the trigger switch of the tool, and so is difficult for a user to see while the tool is being operated. Actuation of the main switch with the forward/reverse switch located in the wrong position may lead to damage to the tool, to a bit driven by the tool or to a fastener to be fixed or released by the tool.

This problem has been addressed in DE33 11 421 by separating the main switch and the forward/reverse switch, so that the forward/reverse switch can be located on an upper surface of the tool which upper surface can generally be seen by a user of the tool in normal operating positions of the tool. This is a disadvantage from a cost and an assembly perspective as two separate switch units are required, as opposed to the preferred type of integrated single switch unit described above. A mechanical interface, in the form of a slideable locking bar, is moved into the path of the trigger switch of the main switch by movement of the forward/reverse switch between the forward and reverse position or vice versa. The mechanical interface is arranged so that when the trigger switch is depressed the trigger switch blocks movement of the locking bar and so prevents movement of the forward/reverse switch between its two positions.

BRIEF DESCRIPTION OF THE INVENTION

The present invention aims to provide a tool with a combined main and forward/reverse switch arrangement which is suitable for use with an integrated switch unit of the type described above and which enables a user to see the forward/reverse switch lever in most normal operating positions of the tool.

According to the present invention there is provided an electric motor driven hand-held tool having a tool housing within which is located an integrated switch unit which switch unit includes an electronic motor control unit, a first actuator which is actuated by a manually operable power member and to which the control unit is responsive to power the motor and a second actuator which is actuated by a manually operable forward/reverse member and to which the control unit is responsive to drive the motor in a selected forward or reverse direction, characterised in that the forward/reverse member is located remotely from the switch unit on a portion of the tool housing which can be seen by a user of the tool during normal operation of the tool and a linkage arrangement is moveably mounted within the tool housing for actuating the second actuator in response to a manual actuation of the forward/reverse member. The use of such a linkage, enables the forward/reverse switch to be located on an easily viewable location on the tool housing, while still enabling the use of an integrated switch unit.

For the forward/reverse lever to be located in a position in which it is easily viewed, but not likely to be inadvertently actuated, the forward/reverse member may be located on a surface of the tool housing which is directed upwardly in the most common operating position of the tool. The forward/reverse member may be located towards the rearward end of said surface of the tool housing so as to be close to the user. Alternatively, the forward/reverse lever may be located on a rearward facing surface of the tool housing which faces towards the user during normal operation of the tool.

The tool, which may for example be a drilling, hammering or screw driving tool may have a housing which has a body portion and a main handle extending from the body portion. In this case the forward reverse member may be conveniently located on the body portion and the power member may be located on the main handle with the switch unit located adjacent the power member. This enables the power member to be actuated by a finger of a hand of a user who is gripping the main handle. The body portion is generally more easily viewed by a user, than the handle portion, during use of the tool. To this end, the forward reverse member may be located, for easy viewing, on an upper facing face of the tool housing (in the normal operating position of the hammer) and the power member may be located on a downwardly facing face of the tool housing with the switch unit located adjacent the power member.

In one embodiment, the linkage is pivotally mounted within the tool housing so that manual actuation of the forward/reverse member causes the linkage to pivot and to actuate the second actuator. Alternatively, the linkage could be slideably mounted within the tool housing. The linkage may be pivotally mounted on a motor housing portion of the tool housing, for example on a closed end of the motor housing, which motor housing end is adjacent to an end of the motor. The closed end of the motor housing may be the rearward end of the motor housing. This provides an easily manufactured and assembled arrangement where the motor housing is a jam pot housing having said closed end and an opposite open end. The pivot axis of the linkage may be parallel to the longitudinal axis of the motor.

The pivotally mounted portion of the linkage may be formed with a central annular portion which is pivotable about a boss formed on the closed end of the motor housing. A first arm may extend from the pivotally mounted portion of the linkage and the forward/reverse member may be located on this first arm. A second arm may extend from the pivotally mounted portion of the linkage and the second arm engages the second actuator. Thus, when the first arm is actuated by actuation of the forward/reverse member, the pivotally mounted portion of the linkage is caused to pivot which moves the second arm, which second arm actuates the second actuator of the switch unit.

A fixing boss may extend from the motor housing and a rear handle portion of the tool housing may be fixed to the motor housing via a fixing which engages the fixing boss and the fixing boss may be made engageable with the linkage to limit movement of the linkage within the tool housing.

BRIEF DESCRIPTION OF THE DRAWINGS

An embodiment of a hammer according to the present invention will now be described by way of example, with reference to the accompanying drawings in which:

FIG. 1 shows a perspective side view of a known design of hammer having a integrated switch unit;

FIG. 2 shows a perspective view of the upper rearward end of a hammer according to the present invention;

DETAILED DESCRIPTION OF THE INVENTION

Figure 3A:
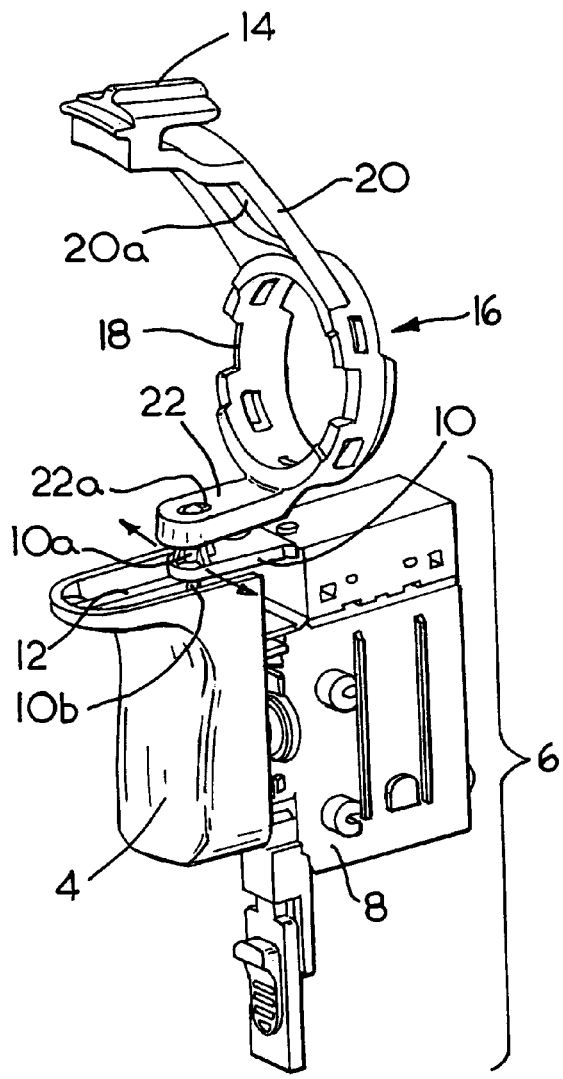
FIG. 3A shows a perspective view of the main switch and forward/reverse switch arrangement used in the hammer shown in FIG. 2.

The hammers shown in FIGS. 1 to 4 have a housing comprising a rear handle housing (2) and a body portion comprising a motor housing (3) and a gear housing (5). The rear handle housing (2) can be fitted to the downward extension of the motor housing (3) to form the downwardly extending main handle of the hammer, which is a pistol grip style handle. The motor housing (3) houses a motor (15) (the outline of which is shown in dotted lines in FIG. 4) of the hammer and is of a jam pot design with an open forward end and a closed rearward end, so that the motor is inserted into the motor housing (3) from the front. The motor is mounted in the jam pot motor housing (3) with its longitudinal axis (7) (shown in dotted lines in FIG. 4) extending parallel to the longitudinal axis of a tool or bit (11) when such a tool or bit is mounted in the tool holder (9) of the hammer. A tool or bit mounted within the tool holder of the hammer will receive repeated impacts from a hammering mechanism of the hammer and/or will be rotatingly driven by a rotary drive mechanism of the hammer, depending on the mode of operation of the hammer selected by a user. The motor drives the hammering mechanism and the rotary drive mechanism of the hammer. Such hammering and rotary drive mechanisms are well known in the art.

As an alternative to the main handle (2), the handle could be a D-shaped handle extending rearwardly from the body portion (3, 5) or where the hammer is an L-shaped hammer with the motor mounted perpendicular to the axis of the tool or bit the handle the handle could be a D-handle extending rearwardly of the motor housing of the hammer.

The hammers shown in FIGS. 1 to 4 comprise a main switch and a forward/reverse switch which are combined in a single integrated switch unit (6). Such integrated switch units generally includes a first actuator (not shown) which is actuated via a trigger switch (4). The trigger switch (4) is located, in a conventional position for pistol grip style handles, at the interface between the front of the rear handle (2) of the hammer and the underside of the body portion (3, 5) of the hammer, so that it can be actuated by a fore finger of a user who is grasping the rear handle. The trigger switch (4) is depressed by a user to turn the motor on and released to turn the motor off. Also, the speed of the motor can be controlled depending on the extent that the trigger switch (4) and thus the first actuator is depressed. The switch unit (6) is located within the main handle adjacent the trigger switch (4). An electronic control unit (8), is incorporated within the integrated switch unit (6) and is electrically connected to the motor of the hammer. The electronic control unit (8) is responsive to the first actuator to apply the appropriate current to the motor. The integrated switch (6) unit also includes a second actuator (10) which can be moved between two positions via a forward/reverse lever moveable by a user. The electronic control unit (8) is also responsive to the second actuator (10) which is moveable in a direction indicated by the arrows in FIG. 3A. In a first forward position of the second actuator the electronic control unit will drive the motor in a forward direction of rotation and in a second rearward position of the second actuator the electronic control unit will drive the motor in a second reverse direction.

The prior art hammer, shown in FIG. 1 is provided with an integrated switch unit (6) and the second actuator (10) is moved between its forward and reverse position by a switch lever (21). The switch lever (21) has a central portion which engages the second actuator (10). The lever (21) is slideably mounted within the motor housing (3) so as to slide laterally and is mounted in the motor housing with its ends extending laterally beyond the outer surface of the motor housing. When a first end of the lever (21), which can be seen in FIG. 1, is pushed towards the hammer housing (3) the second actuator (10) is moved to its reverse position. When a second end of the lever (21) extending from the other side of the hammer housing (3), which cannot be seen in FIG. 1, is pushed towards the hammer housing (3) the second actuator (10) is moved to its forward position. This switch arrangement suffers from the disadvantage, that the forward/reverse lever (21), which has to be actuated by a user is located in the region of the trigger switch (4) of the hammer. Therefore, it is difficult for a user to see the position of the forward reverse lever (21) while the tool is being operated.

The integrated switch unit (6) used in the hammers of FIGS. 1 to 4 is arranged so that the second actuator (10) cannot be moved between its forward and reverse positions while the trigger switch (4) is depressed, ie. while the motor is running. A wall (12) is formed within the trigger switch (4) so that in the forward position of the second actuator (10), a depending portion (10b) of the second actuator (10) is located to the left hand side of the wall (12) (see position in FIG. 3). In the reverse position of the second actuator (10), the depending portion (10b) of the second actuator is located to the right hand side of the wall (12). Thus, when the trigger (4) is depressed the depending portion (10b) and thus the second actuator (10) is held on one side of the wall (12) and cannot be moved to its other position.

Figure 3B:
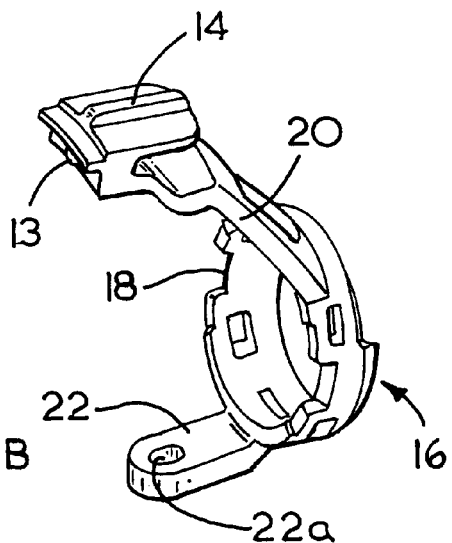
FIG. 3B shows a perspective view of the forward/reverse linkage used in the forward/reverse switch arrangement of FIG. 3A.
Figure 4:
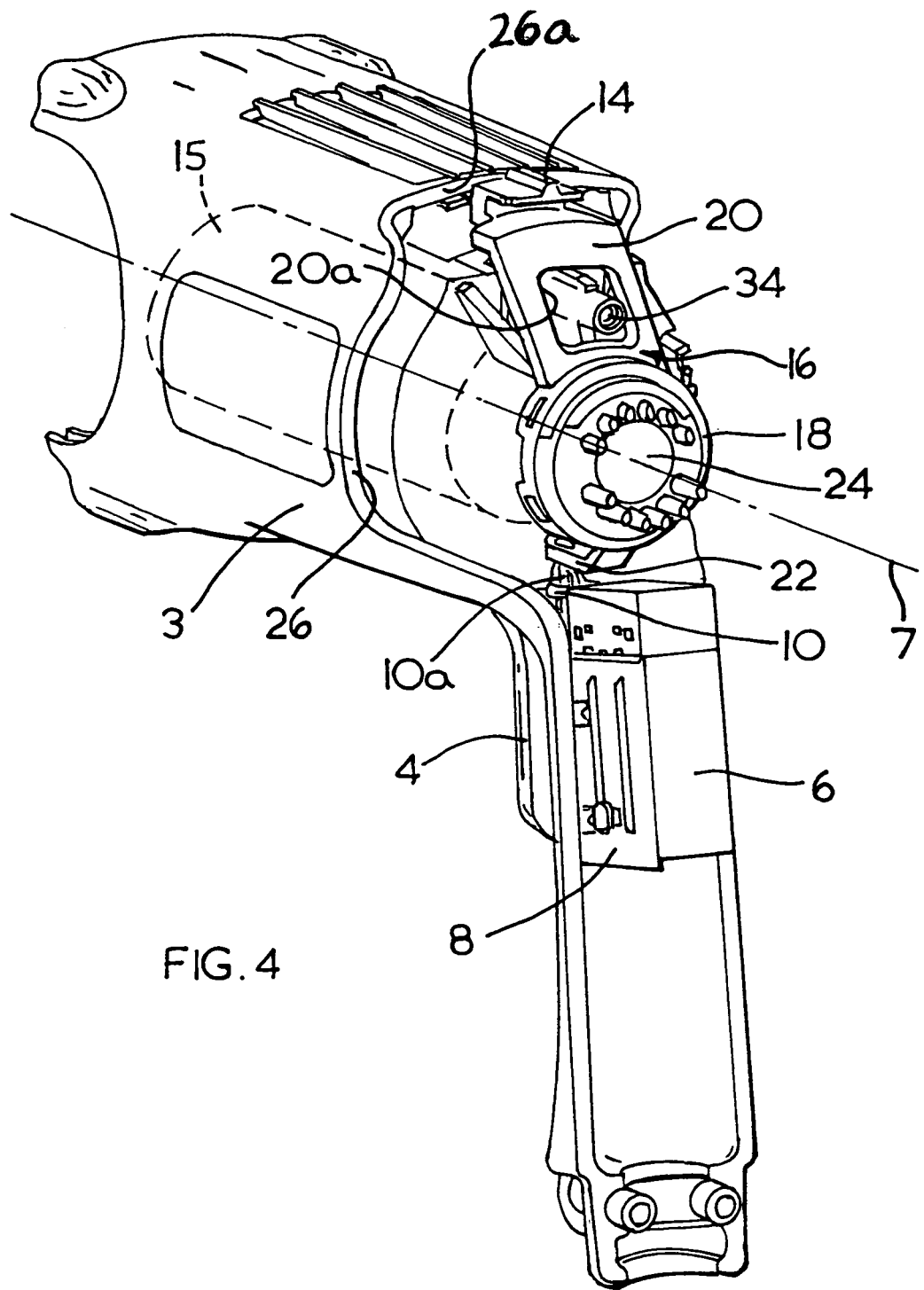
FIG. 4 shows a perspective view of the hammer of FIG. 1 with the rear handle cover removed to show the location of the main switch and forward/reverse switch arrangement shown in FIGS. 3A and 3B.

An improved forward/reverse switch arrangement, according to the present invention is shown in FIGS. 2 to 4. The forward/reverse lever (14) which is actuated by a user is located on the upper part of the motor housing (3) (ie. the part of the housing which is directed upwardly in the most common operating position of the hammer) some distance above the trigger switch (4), as shown in FIGS. 2 and 4. Thus, a linkage (16), as shown in FIGS. 3A, 3B and 4, is required to actuate the second actuator (10) of the integrated switch unit (6).

The linkage (16) has an annular central portion (18) and an upwardly extending arm (20) with the forward/reverse lever (14) located at the end of the upwardly extending arm remote from the annular portion (18). The linkage (16) also has a downwardly extending arm (22) which incorporates a through hole (22a) for receiving a pin (10a) formed on the second actuator (10) of the integrated switch unit (6). The annular portion (18) of the linkage (16) is pivotally mounted around the periphery of a circular boss (24) which boss is formed on the rearward closed end of the motor housing (3). The linkage (16) is arranged to pivot about an axis (7) which is parallel to the longitudinal axis of the motor.

A rear handle housing part (2) is fitted to the rear of the motor housing (3) so that a peripheral rim at the forward edge of the rear handle housing (2) abuts a peripheral rim (26) at the rearward edge of the motor housing (3) (See FIG. 2). The rear handle housing has a portion (not shown) which abuts the boss (24) in order to secure the annular portion (18) of the linkage (16) pivotally around the boss (24). The rear handle housing (2) has a recess (30) in the forward edge of its upper portion which mates with the rearward rim (26a) of the upper portion of the motor housing (3) to form a hole in the hammer housing through which the forward/reverse lever (14) extends. Thus, the forward/reverse lever (14) is located on an a rearward part of an upper face of the hammer housing in the normal operating position of the hammer. The upwardly extending arm (20) of the linkage (16) is formed with a through hole (20a) through which a screw boss (34) extends rearwardly from the motor housing (3). The screw boss (34) is engageable with the edges of the through hole (20a) in the arm (20) so as to limit the extent of the pivotal movement of the linkage (16). A screw which extends through the rear handle housing (2) is secured within the screw boss (34) so as to fix the rear handle housing (2) to the motor housing (3).

With the trigger (4) released, the forward/reverse lever (14) can be moved by a user to the desired forward or reverse position. This causes the linkage (16) to pivot about the boss (24) to cause the lower arm (22) to move the second actuator (10) to the desired forward or reverse position. The forward facing edge of the forward/reverse lever (14) may be formed with a small projection (13) which is selectively engageable, in a snap fit with one of a corresponding pair of recesses formed in the rearward facing rim (26a) of the motor housing (3) adjacent the lever (14). The projection resiliently engages one of the recesses in a snap fit in the forward position of the lever (14) and the other of the recesses in the reverse position of the lever (14). When the lever (14) reaches its forward or reverse position, an audible click is generated by the projection (13) engaging the relevant recess, which provides an indication to the user. Also, the engagement between the projection (13) and the relevant recess maintains the lever (14) in its desired position despite the vibration of the hammer.

The invention claimed is:

1. An electric motor driven hand-held tool comprising a tool housing, a handle projecting from a first side of the housing, a motor located within the housing, an integrated switch unit (6), the switch unit including an electronic motor control unit (8) having an actuator, a first in manually operable switch member (4) located in the handle and adjacent to the integrated switch unit and operatively connected to the motor control unit and to which the motor control unit is responsive to power the motor, and a second manually operable switch member (14) located in the housing at a second side substantially opposite to the first side and operatively connected to the motor control unit via the actuator (10) and to which the control unit is responsive to drive the motor in one of a selected forward and reverse direction, characterised in that the second manually operable switch member (14) is located remotely from the switch unit (6) on an upward facing portion of the tool housing which can be seen by a user of the tool during normal operation of the tool, and a linkage arrangement (16) including a central annular portion which is pivotally mounted on a boss formed on a motor housing portion (3) of the tool housing so that manual actuation of the second manually operable switch member (14) causes the linkage to pivot and to actuate the actuator (10).

2. An electric motor driven hand-held tool according to claim 1 wherein the first manually operable switch member (4) is located on a downwardly facing surface of the tool housing.

3. An electric motor driven hand-held tool according to claim 1 wherein the linkage arrangement (16) is pivotably mounted on a closed end of the motor housing (3), which motor housing end is adjacent to an end of the motor.

4. An electric motor driven hand-held tool according to claim 3 wherein the closed end of the motor housing (3) is the rearward end of the motor housing.

5. An electric motor driven hand-held tool to claim 1 wherein the linkage arrangement (16) is pivotally mounted on the boss about a pivot axis of the linkage arrangement (16) which is parallel to the longitudinal axis of the motor.

6. An electric motor driven hand-held tool according to claim 1 wherein the motor housing is a jam pot housing (3) including a closed end and an opposite open end.

7. An electric motor driven hand held tool according to claim 1 and further including a fixing boss (34) extending from the motor housing portion (3), and a rear handle portion (2) of the tool housing, and wherein the rear handle portion is fixed to the motor housing (3) via a fixing which engages the fixing boss (34), and the fixing boss (34) is engageable with the linkage arrangement (16) to limit movement of the linkage arrangement (16) within the tool housing.

8. An electric motor driven hand-held tool according to claim 1, and the linkage arrangement (16) includes a first arm (20) extending from the linkage arrangement, and second manually operable switch member (14) is located on the first arm, and a second arm (22) extending from the linkage arrangement, and the second arm (22) engages the actuator (10).

9. An electric motor driven hand-held tool according to claim 1 wherein the first manually operable switch member (4) is a trigger switch.

10. An electric motor driven hand-held tool comprising a tool housing, a handle projecting from a first side of the housing, a motor located within the housing, an integrated switch unit (6), the switch unit including an electronic motor control unit (8) harm an actuator, a first manually operable switch member (4) located in the handle and adjacent to the integrated switch unit and operatively connected to the motor control unit and to which the motor control unit is responsive to power the motor, and a second manually operable switch member (14) located in the housing at a second side substantially opposite to the first side and operatively connected to the motor control unit via the actuator (10) and to which the control unit is responsive to drive the motor in one of a selected forward and reverse direction, characterised in that the second manually operable switch member (14) is located remotely from the switch unit (6) on an upward facing portion of the tool housing which can be seen by a user of the tool during normal operation of the tool, and a linkage arrangement (16) is pivotally mounted on a motor housing portion (3) of the tool housing so that manual actuation of the second manually operable switch member (14) causes the linkage to pivot and to actuate the actuator (10) and wherein the first manually operable switch member (4) and switch unit (6) are arranged such that when the first manually operable switch member (4) is acted on by a user of the tool so as to power the motor, the first manually operable switch member (4) holds the actuator (10) against movement by the linkage (16).

11. An electric motor driven hand-held tool according to claim 10 wherein the first manually operable switch member (4) is located on a downwardly facing surface of the tool housing and wherein the linkage arrangement (16) is pivotably mounted on a closed end of the motor housing (3), which closed end of the motor housing is the rearward end of the motor housing.

12. An electric motor driven hand held tool according to claim 10 wherein the linkage arrangement (16) is formed with a central annular portion (18) which is pivotable about a boss (24) formed on the motor housing (3).

13. An electric motor driven had-held tool according to claim 10 wherein the motor housing is a jam pot housing (3) including a closed end and an opposite open end.

14. An electric motor driven hand-held tool comprising:
 a tool housing including a motor housing portion, an upper facing portion, a lower facing portion, and an interior circular boss;
 a handle, extending downward from the lower facing portion of the tool housing;
 a motor located within the motor housing portion and defining a longitudinal axis;
 an integrated switch unit including an electronic motor control unit and located in the handle;
 a first manually operable switch member projecting the through handle and operatively connected to the motor control unit, and whereby a tool user controls the speed of the motor;
 a second manually operable switch member projecting through the upward facing portion of the motor housing and whereby a tool user controls the direction of the motor, and
 a linkage arrangement including a central annular portion pivotably mounted on the interior circular boss within the tool housing, and a first arm extending from the central annular portion of the linkage and the second manually operable switch member is located on the first arm for operatively connecting the second manually operable switch member to the motor control unit and the pivot axis of the linkage arrangement is parallel to the longitudinal axis of the motor.

15. An electric motor driven hand-held tool according to claim 14 wherein the motor housing portion is a jam pot housing including a closed end and an opposite open end.

16. An electric motor driven hand-held tool according to claim 15 wherein the interior circular boss is located on the closed end of the motor housing, which motor housing end is adjacent to an end of the motor.

17. An electric motor driven handheld tool according to claim 16 wherein the closed end of the motor housing is proximate to the handle.

18. An electric motor driven hand-held tool according to claim 14 and further including a second arm extending from the central annular portion, and the second arm engages an actuator.

19. An electric motor driven hand-held tool according to claim 14 wherein the first manually operable switch member is a trigger switch.

20. An electric motor driven hand-held tool according to claim 14 wherein the first manually operable switch member and integrated switch unit are arranged such that when the first manually operable switch member is acted on by a user of the tool so as to power the motor, then the first manually operable switch member holds the actuator against movement by the linkage.

* * * * *